Sept. 22, 1970          A. PITNER          3,529,876
JOURNAL ROLLING BEARING ASSEMBLY CAPABLE OF FIXING THE
AXIAL POSITION OF A MACHINE ELEMENT
Filed Jan. 30, 1968          3 Sheets-Sheet 1
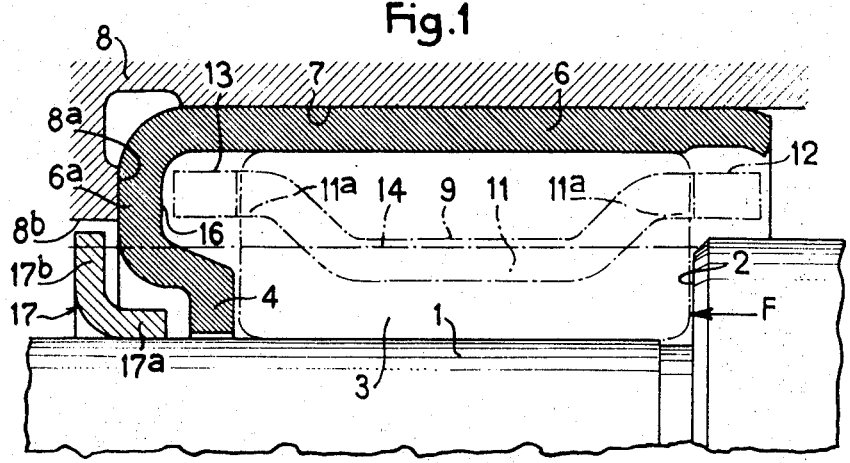
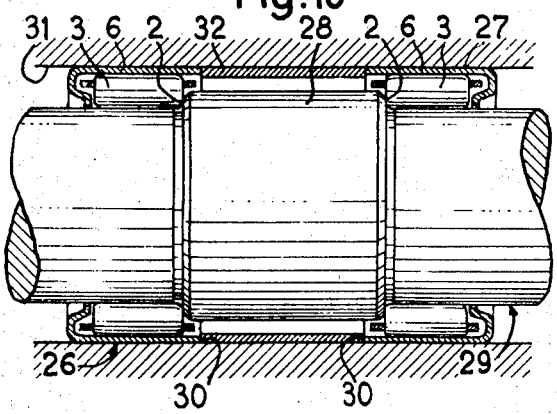
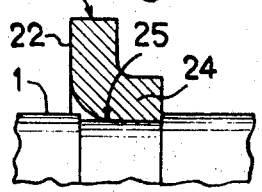 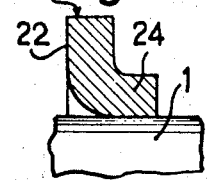 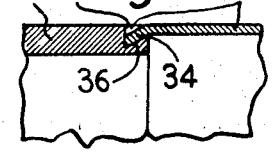

Sept. 22, 1970    A. PITNER    3,529,876
JOURNAL ROLLING BEARING ASSEMBLY CAPABLE OF FIXING THE
AXIAL POSITION OF A MACHINE ELEMENT
Filed Jan. 30, 1968    3 Sheets-Sheet 3

United States Patent Office 3,529,876
Patented Sept. 22, 1970

3,529,876
JOURNAL ROLLING BEARING ASSEMBLY CAPABLE OF FIXING THE AXIAL POSITION OF A MACHINE ELEMENT
Alfred Pitner, Paris, France, assignor of one-half to Nadella S.A., a French body corporate
Filed Jan. 30, 1968, Ser. No. 701,673
Claims priority, application France, Feb. 10, 1967, 94,430; Sept. 12, 1967, 120,659
Int. Cl. F16c 35/06
U.S. Cl. 308—207     34 Claims

ABSTRACT OF THE DISCLOSURE

An assembly of at least one journal rolling bearing capable of fixing a machine element in axial position with respect to another machine element and comprising elongated rolling elements radially guided by two raceways which are fixed or formed on the respective machine elements, wherein the rolling elements are needles which are circumferentially guided by a cage and have opposed ends forming support faces for two radial abutment faces respectively integral with the raceways, whereby the relative axial position of the machine elements is fixed at least in one direction.

---

It is known in the roller bearing industry to employ bearings having one or two rows of rollers capable of fixing the axial position of a machine element in one or both directions with respect to another machine element.

In such bearings, the rollers are maintained in position circumferentially either by a contacting relation of the latter or by means of a cage which performs a separating function in maintaining the rollers spaced apart from each other. As concerns the guiding of the rollers in the direction parallel to the axis of rotation, this is achieved by means of end faces of the rollers, which are maintained between two guide faces constituted either by shoulders pertaining to the outer and/or inner bearing ring or by the side faces of the cage which also performs the roller separating function. These shoulders and/or additional associated shoulders also fix the axial position of the machine element in one or both directions.

The utilization of roller bearings for fixing the axial position of machine elements has however the drawbacks of resulting in a relatively large overall size which is prohibitive in certain applications, such as the assembly of water pump shafts for automobile vehicles, and, moreover, of requiring, on one hand, means axially fixing the rings relative to the machine elements and, on the other hand, an expensive machining consisting of the fine grinding, to extremely precise dimensions, of the mutual support faces provided respectively on the ring and on the ends of the rollers for guiding the latter, as mentioned hereinbefore.

In order to overcome these drawbacks, the object of the invention is to provide an assembly of at least one journal rolling bearing capable of fixing the axial position of a machine element with respect to another and comprising elongated rolling elements which are guided radially by two raceways which are fixed on or formed on the respective machine elements, wherein the rolling elements are needles which are circumferentially guided by a cage and have opposed ends forming support faces for two radial abutment faces respectively integral with the raceways, whereby the relative axial position of the machine elements is fixed at least in one direction.

With this arrangement, it is possible to take advantage of the small radial dimensions which relates to the utilization of needles as rolling elements without however requiring special rolling elements for absorbing the axial thrust of the machine element. Further, it permits making use of the conventional guide function of the needle cage and the circumferential stability it imparts to the needles so as to employ the latter as abutment elements between two radial faces integral with each of the raceways and consequently integral with the machine part, whose relative axial position must be fixed, whereas in roller bearings the guiding in the direction parallel to the axis of rotation exclusively results from the contact of the plane faces of the rollers with the radial support faces.

It must be added that, on account of the great length of the elements relative to their diameter, the needles cannot be guided circumferentially by the end faces, even if these faces are plane and ground with precision, since wedging could occur between these ends and the guide faces. Moreover, it is generally acknowledged that this is what characterizes the needle bearing relative to the roller bearing.

To achieve a better guiding, the cage must bear on generatrices of the cylindrical face of the rolling elements in a region which is as near as possible to the ends of this cylindrical face and with minimum clearance. This cage can be of any type. It can be for example in accordance with the teaching of British Pat. No. 931,318 or, better still, constructed in accordance with the U.S. Pat. No. 3,199,935 which discloses a segmented cage in which the action of centrifugal force ensures a precise guiding owing to the elimination of the clearance between needle and aperture. It can also be of the "comb" type having a single rim or marginal portion so as to ensure on at least one side an improved contact between the abutment faces and the ends of the rolling elements.

In order to avoid the drawbacks which, in known roller arrangements, result not only from the grinding of the support and guide shoulders formed on or attached to the rings, but also from the prior machining of the ring blanks, the invention provides a preferred arrangement in which the ring or each ring, in which a raceway and a shoulder are formed, is of sheet metal cold formed in the known manner. Further, this ring has the advantage of being fixable in the corresponding machine element merely by fitting it therein, whereas axial fixing means are necessary in the case of roller rings.

Two rolling bearings can be employed according to the invention on either side of a mechanism so as to fix it in position axially in both directions, but a particularly interesting form of application of the invention is that of a pair of relatively close bearings employed with the interposition of a cylindrical spacer member having a diameter in the neighbourhood of that of the rings so as to ensure the axial position in both directions of a machine element, such as a shaft which has a double shoulder (possibly composite) thereby constituting a double bearing such as that generally employed in explosion engine cooling water pumps.

In such a case, in order to avoid—owing to the fixed nature of the radial abutment faces on the machine element and the excess or insufficient clearance which might exist between the ends of the needles and the associated abutment faces—that inaccuracy in the axial positioning occur, the invention also provides an advantageous arrangement in which means are interposed between the two radial abutment faces connected to the machine element, which means regulate the distance between the faces by taking up or rectifying deviations from normal operational clearance which result from conditions of machining, assembly or operation.

This arrangement integrates the abutment faces of the machine element in a device having a variable axial length, whereby the end faces of the needles and their direct or indirect supports on the radial abutment faces are subjected to a predetermined stress.

Further features and advantages of the invention will be apparent from the ensuing description with reference to the accompanying drawings.

In the drawings:

FIG. 1 is a sectional view of a needle bearing which fixes the axial position of a shaft in one direction;

FIG. 2 is a view of a modification of the embodiment shown in FIG. 1;

FIG. 3 is a view of a modification of the embodiment shown in FIG. 2;

FIG. 8 is a view of a modification comprising a relief chamber;

FIG. 10 is a sectional view of a double needle bearing which fixes the axial position of a shaft in both directions;

FIG. 11 is a view of a manner of connecting the rings of the double bearing shown in FIG. 9 with an intermediate spacer member;

Figure 6:
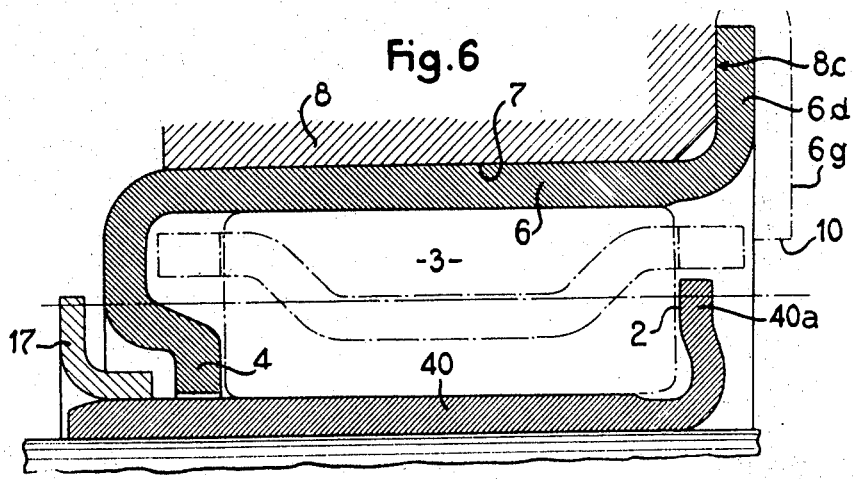
FIG. 6 is a view similar to FIG. 1 for a bearing having two rings.

The machine part or shaft 1 shown in FIG. 1 is axially fixed in position in the direction of arrow F by a shoulder 2 which serves as a support for one of the ends of the rolling elements or needles 3 and a radial side wall or flange 4 which constitutes an abutment for the other end of the needles and is formed on the outer ring 6. The latter is produced by cold forming a thin sheet metal and is a tight fit in a bore 7 of a machine part or support 8.

The needles 3 are axially guided by a cage 9 whose bars 11 have a trapezoidal profile and include short rectilinear terminal portions 11a which guide the ends 3a of the needles and are in the extension of the generatrices of the rims or marginal portions 12, 13 of the cage.

Both of these rims or marginal portions are outside the mean cylinder 14 of the ring of needles, the portion 12 being located beyond the shoulder 2 and in vertical alignment with the large-diameter part of the shaft 1 whereas the left portion 13 is located in a recess 16 in the radial flange 6a of the ring 6 which backs against a shoulder 8a of the support 8 and whose axially offset free edge constitutes the flange 4 of axial abutment. This flange 4 is thus radially in alignment with the marginal portion 13 and axially in alignment with the shoulder 2 of the shaft 1. Further, provided between the flange 4 and the raceway, constituted by the shaft 1, is a relatively small clearance which in itself seals the bearing.

The bearing can be completed by a ring 17 fitted on the shaft and performing the function of protecting the bearing to which is added, before mounting the bearing in the support 8, the function of a retainer for the assembly comprising the ring 6 and the needles 3. In the illustrated embodiment, the ring 17 comprises a cylindrical wall 17a fixed to the shaft 1 and a radial flange 17b whose free edge is adjacent the cylindrical face 8b defining the shoulder 8a.

In FIG. 2, the support shoulder 22 of the machine part or shaft 1 is formed on the radial flange of a ring 23 which is attached to the shaft by insertion of its cylindrical part 24 in a recess 25.

In the modification shown in FIG. 3, the ring 23, whose flange 22 constitutes an attached shoulder, is simply fitted on the smooth cylindrical face of the shaft 1 so that its axial position can be chosen at will.

Figure 4:
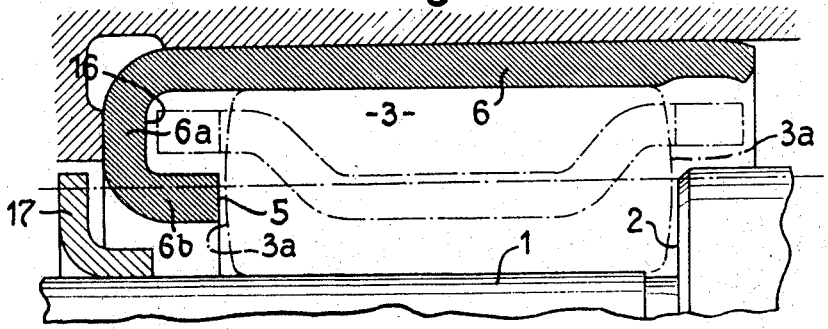
FIG. 4 is a view of a modification of the bearing shown in FIG. 1.

In FIG. 4, the ends 3a of the rolling elements or needles, which are convex or crowned and not plane, abut on the left the plane end face 5 of the cylindrical flange 6b of the radial flange 6a inwardly defining the recess 16 whereas, on the right the radial abutment face is, as before, constituted by the shoulder 2 of the shaft 1.

Figure 5:
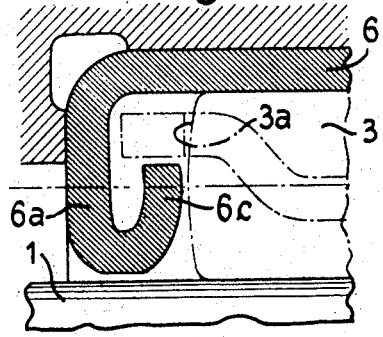
FIG. 5 is a view of another modification of the bearing shown in FIG. 1.

In FIG. 5, the needle ends are also crowned or convex and the radial abutment face is constituted, on the left, by a radial flange 6c, also crowned or convex, obtained by bending the radial flange 6a in a direction parallel to itself.

Compared with the bearing shown in FIG. 1, the bearing shown in FIG. 6 differs by the fact that the outer ring 6 has a second radial flange 6d through which it backs against a shoulder 8c on the machine part or support 8 located substantially in alignment with the right end of the rolling elements or needles 3 and, furthermore, by the fact that the shoulder 2 is constituted by a radial flange 39a of an inner ring 39 which carries the second raceway on which the protecting and retaining ring 17 is fitted.

Figure 7:
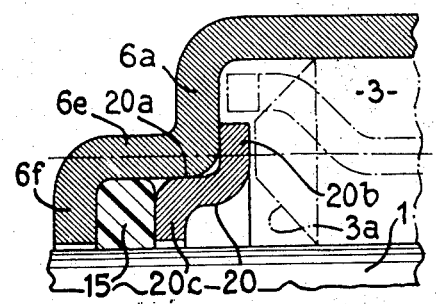
FIG. 7 is a view of a bearing similar to that shown in FIG. 1, provided with a sealing element.

In the embodiment shown in FIG. 7, the radial flange 6a has a stepped profile which forms a cylindrical flange 6e extended by a radial flange 6f and these two flanges define a recess in which is fitted a sealing ring 15 in contact with the shaft 1. An annular member 20 fitted in the cylindrical flange 6e by its cylindrical face 20a comprises two radial walls 20b, 20c extending in opposite directions and respectively applied against the radial flange 6a and the sealing ring 15. The face of the radial wall 20b opposed to the flange 6a constitutes an abutment face for the plane adjacent face of the left end 3a of the rolling elements or needles 3, this end having a frustoconical shape.

In the embodiment shown in FIG. 8, the portion 6a of the radial flange has a double curve which defines a support bulge or bead 45 for the ends of the rolling elements or needles 3. The annular space defined by the portions 6e, 6f receives the marginal portion 13 of the cage and furthermore constitutes a relief chamber 46 for the lubricant. The excess pressure which could arise in the region of the flange 6f, forming a retaining lip for the lubricant, is in any case avoided by the pumping effect produced by the rotation of the cage 9. The lip 6f could moreover be axially bent towards the needles 3 and form a sleeve to render its action more effective.

Figure 9:
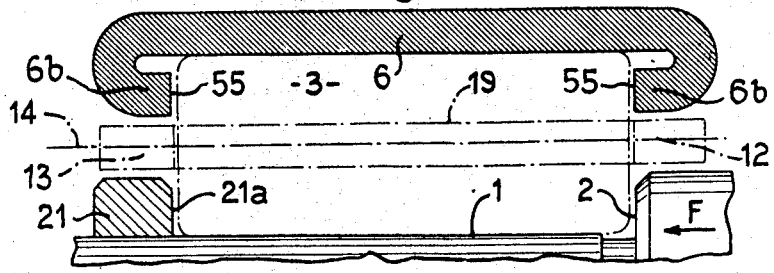
FIG. 9 is a view of a modification of the bearing shown in FIG. 1 comprising a purely cylindrical cage.

Whereas in all the foregoing embodiments the cage 9 has a trapezoidal profile, the cage 19 of the bearing shown in FIG. 9 has a rectilinear profile. The cage therefore has a purely cylindrical shape, the corresponding cylinder coinciding roughly with the mean cylinder 14 of the ring of rolling elements or needles 3. As in FIG. 4, the radial abutment faces for the needles are constituted respectively by the plane end face 55 of a cylindrical flange 6b of the ring 6 and by a shoulder 2 of the shaft 1. The marginal portions or rims 13, 12 of the cage 19 are located in axial alignment with the two cylindrical flanges 6b in the space defined by these flanges and respectively a ring 21 attached to the shaft and the large-diameter portion of the shaft 1. The presence at each needle end of two radial abutment faces on the respective raceways (55, 21a on the left, and 55, 2 on the right) retains the shaft 1 not only in the direction of arrow F but in the opposite direction.

In the arrangement shown in FIG. 10, the axial position of the shaft is also fixed in both directions. This figure shows two rolling bearings 26, 27 which are identical to the bearing shown in FIG. 1 and disposed at each end of the large-diameter portion 28 of a shaft 29 which therefore includes two shoulders 2 bearing against the rolling elements or needles 3 of the bearings. The rings 6 of the two bearings are fitted in the bore 31 and spaced apart by a cylindrical spacer member 32 against the ends of which the open ends 30 of the two rings 6 abut. The length of the spacer member 32 is determined as a function of the axial dimension of the large-diameter portion 28 of the shaft 29, taking into account the required axial operational clearance.

This clearance can, moreover, be adjusted in the arrangement shown in FIG. 3 by replacing the centre portion 28 by two rings similar to the rings 23 or by adopting a solution based on that shown in FIG. 7 consisting in the utilization of an abutment face 20b formed on an attached member 20.

The open ends 30 of the two rings 6 could, moreover, be directly urged against each other either because the short length of the portion 28 of the shaft renders the spacer member 32 unnecessary or because the rings 6 are axially extended the required distance. They can, moreover, be spaced apart the necessary distance to apply the assembly to a machine in which the centre portion 28 is constituted by a mechanical part of large volume, such as the rotor of an electric machine.

An at least precarious connection could be provided between the two rings 6 if they are in adjoining relation to each other or between each of the rings and the spacer member 32 in the case shown in FIG. 10 so as to create an assembly interconnecting the two bearings and the shaft 29 retained by its two shoulders. An embodiment of such a connection is shown in FIG. 11 which shows axial tongue portions or tabs 34 formed at the open end of one of the rings 6 and engaged, in forming a kind of fastener, into a corresponding recess 36 in the adjacent end portion of the spacer member 32. It will be understood that the circumferential dimension of the tabs 34 must be relatively small so as to avoid excessively decreasing the face of abutment of the ring 6 against the spacer member 32.

The contemplated connection could also be achieved by any of the following means: Fitting the rings-spacer member-shaft assembly in a cartridge, for example in accordance with the teaching of French Pat. No. 778,688 or 1,379,769; a force fit in a continuous outer tube which is not eliminated in the course of the utilization assembly so as to take into account, if need be, a discontinuous bore which is incompatible with the utilization of thin rings formed from sheet metal, owing to the circumferential deformation which results therefrom or the impossibility of assembling a composite unit owing to this discontinuity; utilization of elastomer sealing rings normally provided on the shaft which, in acting as "garters" on the shaft, prevent the disassociation of the bearing assembly and possibly the spacer member before their final mounting; the mounting on the shaft, at each end of the bearing rings, of a ring which is a force fit on the shaft, in the same way as the ring 17 shown in FIG. 1.

Figure 12:
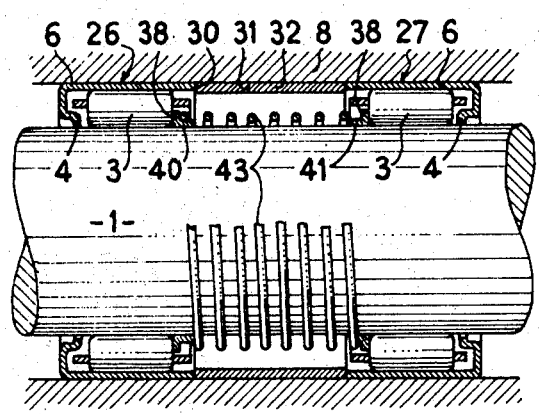
FIG. 12 is an axial sectional view of a shaft which is retained axially in both directions by two needle bearings, with interposition of a spring.

In FIG. 12, the needles 3 of the two bearings 26, 27 which fix the shaft 1 axially in both directions, bear, by their end face opposed to the radial flange 4 of the corresponding outer ring 6, on the radial face 38 of a washer 40 or 41 surrounding the shaft 1.

The right washer 41 is adjacent the bearing 27 and fixed on the shaft whereas the left washer 40 is adjacent the bearing 26 and slidable on the shaft while remaining in contact, under a given pressure, with the corresponding end of the needles 3, under the effect of a compression spring 43 interposed between the two washers.

Figure 13:
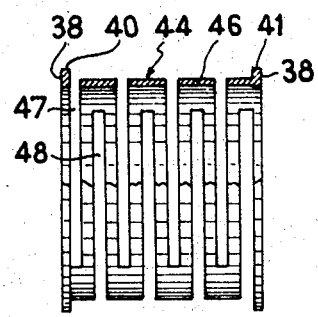
FIGS. 13–16 are views of modifications of the abutment device connected to the shaft and interposed between the two bearings.

In FIG. 13, the two washers 40, 41 are provided at the two ends of and unitary with a sleeve 44 whose cylindrical portion 44a comprises transverse slots 47, 48 imparting an axial elasticity thereto which varies the distance between the radial abutment faces 38 of the two washers, as in the embodiment shown in FIG. 12.

Figure 14:
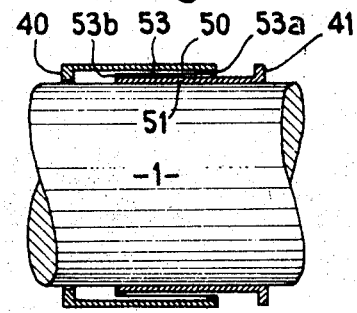

In the embodiment shown in FIG. 14, the fixed washer 41 and the movable washer 40 are respectively integral with two concentric tubular members 51, 50 which are interconnected in the region of the overlapping zone of the elements by an intermediate annular expansion spacer member 53 which is fixed at its ends 53a, 53b to the corresponding ends of the tubular elements 51, 50. The material and the length of the spacer member 53 are so chosen that variations in its length due to heat expansion in operation modify the axial distance between the two washers 40, 41 an amount which is equal and in opposite directions to the relative variation, also due to the heat expansion of the shaft 1 and the assembly comprising the two rings 6 of the bearings and the spacer member 32, so that the two washers 40, 41 maintain a roughly invariable operational axial clearance. The tubular element 51 could, of course, have an axial elasticity in the same way as the sleeve 44 shown in FIG. 13.

Figure 15:
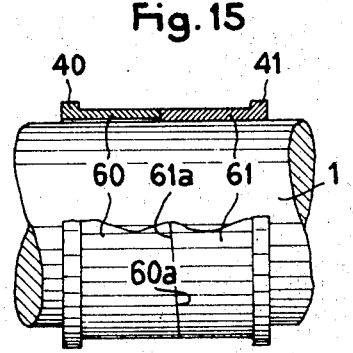

In FIG. 15, the washers 41, 40, which are respectively fixed in position and movable, are integral with two tubular members 61, 60 which surround the shaft 1 and whose contacting ends 61a, 60a have a helical or inclined shape so that, as a result of the circumferential driving of the movable member 60 under the effect of the rubbing of the ends of the needles on the face 38 of the washer 40, a relative rotation tends to take place between the two tubular members which results in a separation of the two washers 40, 41, that is, in the taking up of any excess clearance or play.

Figure 16:
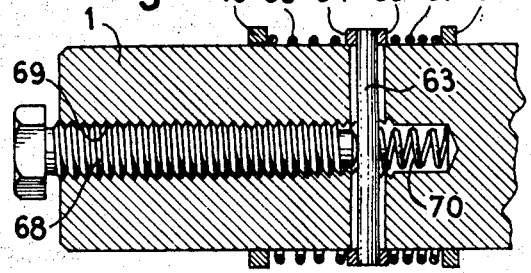

In the embodiment shown in FIG. 16, the two washers 40, 41 are free and a pin 63 extends diametrically across the shaft 1 and retains a washer whose two radial faces 64, 65 offer a support face to one of the ends of two springs 66, 67, of different flexibilities if desired, the other end of which springs bears against the washers 40 or 41. A screw 68 or the like engaged in a bore 69 of the shaft 1 and coaxial with the latter, axially regulates the position of the pin 63 in opposition to the action of an opposing spring 70 located in the end of the bore 69. The position and the stress on the respective washers in contact with the corresponding bearings can thus be modified.

The assembly shown in FIG. 12 and the modifications shown in FIGS. 13–16 can be applied in all cases in which the precise axial positioning of a rotating machine element is desirable. By way of examples, there may be mentioned water pumps for explosion engines and electric motors having an axial air-gap. As concerns water pumps, it will be observed that if the axial position of the shaft is not fixed or determined with precision a slight balancing in the axial direction could occur owing, for example, to vibrations brought about by the driving system and in certain cases the sealing elements, although they are axially spring biased, cannot follow these vibrations at certain frequencies so that the seal becomes precarious owing to the incorrect bearing of these members as a result of their hysteresis proper and forces of inertia.

In particular, the described arrangements could be applied to the case in which the bearing or each bearing comprises a single ring which would be an inner ring, the second raceway being constituted by the wall of a bore.

Note moreover a modification suggested in FIG. 6 consisting in bending up at the right end of the ring 6 an extension of the flange 6d so as to form a radial flange 6a which defines an inner opening 10 whose diameter is less than that of the raceway of the ring 6. In the case where the inner raceway is formed on a shaft, this arrangement axially retains the needles before mounting.

Having now described my invention what I claim as new and desire to secure by Letters Patent is:

1. An assembly having an axis of rotation and comprising in coaxial relation: a first machine element, a second machine element, a journal rolling bearing interposed between said machine elements and comprising means defining two raceways axially fixed in position relative to said machine elements, rolling elements interposed between and radially guided by said raceways, and second means for preventing relative movement between said machine elements in a direction parallel to said axis, said assembly being characterized in that each of said rolling elements is a needle having plane end faces which are perpendicular to the axis of the needle and said second means consist of the combination of said needles, a cage having bars including rectilinear bar portions which are parallel to said axis of rotation and interposed between said needles and capable of coating with rectilinear portions of said needles adjacent said end faces thereof so as to maintain said needles parallel to said axis of said assembly, and two radially and circumferentially extending abutment faces respectively integral with said raceways and contained in planes perpendicular to said axis, one of said abutment faces being engageable with one of said end faces of each needle and the other of said abutment faces being engageable with the other of said end faces of each needle.

2. An assembly having an axis of rotation and comprising in coaxial relation: a first machine element, a second machine element, a journal rolling bearing interposed between said machine elements and comprising means defining two raceways axially fixed in position relative to said machine elements, rolling elements interposed between and radially guided by said raceways, and second means for preventing relative movement between said machine element in a direction parallel to said axis, said asssembly being characterized in that each of said rolling elements is a needle having plane end faces which are perpendicular to the axis of the needle and said second means consist of the combination of said needles, a cage having bars including rectilinear bar portions which are parallel to said axis of rotation and interposed between said needles and capable of coacting with rectilinear portions of said needles adjacent said end faces thereof so as to maintain said needles parallel to said axis of said assembly, one of said raceways being on a ring of cold-formed sheet metal closely engaging a cylindrical face on one of said machine elements, and two radially and circumferentially extending abutment faces respectively integral with said raceways, one of said abutment faces being engageable with one of said end faces of each needle and the other of said abutment faces being engageable with the other of said end faces of each needle.

3. An assembly as claimed in claim 2, wherein the abutment face integral with the raceway on said ring is formed directly on said ring.

4. An assembly as claimed in claim 3, wherein the ring has a radially extending flange having a stepped profile in radial section defining a cavity, said abutment face being a face of said flange.

5. An assembly as claimed in claim 4, wherein said cavity is adjacent the free edge of said flange and forms a relief chamber for the lubricant.

6. An assembly as claimed in claim 4, wherein said cavity is adjacent the free edge of said flange and forms a housing, a sealing ring being disposed in said housing.

7. An assembly as claimed in claim 1, wherein at least one of said abutment faces is on a member attached to the corresponding raceway.

8. An assembly as claimed in claim 1, wherein said abutment faces are located substantially at the same radial distance from the axis of said assembly.

9. An assembly as claimed in claim 8, wherein said distance is substantially equal to half the diameter on which said needles are arranged.

10. An assembly as claimed in claim 8, wherein said distance is different from half the diameter on which said needles are arranged, the ends of said needles having a plane face.

11. An assembly as claimed in claim 1, wherein said needles are cylindrical and said cage coacts with generatrices of the cylindrical face of the needles in a region which is as near as possible to the ends of said cylindrical face.

12. An assembly as claimed in claim 1, wherein said cage is of the "comb" type, it having only one circumferentially extending marginal portion.

13. An assembly as claimed in claim 4, wherein a circumferentially extending marginal portion of said cage is located in said cavity.

14. An assembly as claimed in claim 13, wherein said marginal portion and said abutment face are disposed at each end of the mean geometric cylinder on which said needles are arranged.

15. An assembly as claimed in claim 1, comprising a retaining ring attached to one of said raceways.

16. An assembly as claimed in claim 2, wherein said ring is an outer bearing ring which is an interference fit in a bore in the corresponding machine element.

17. An assembly as claimed in claim 1, wherein two of said abutment faces are integral with each of said raceways, the corresponding ends of said needles being engageable with said abutment faces so as to be axially supported thereby, whereby one of said machine elements is axially retained in both directions relative to the other of said machine elements.

18. An assembly having an axis of rotation and comprising in coaxial relation: a first machine element having two annular axially spaced shoulders; a second machine element; two journal rolling bearings interposed between said machine elements; one of said bearings fixing the axial position of one of said machine elements relative to the other in one direction and the other of said bearings fixing said axial position in the opposite direction; each of said bearings comprising means defining two raceways axially fixed in position relative to said machine elements, rolling elements interposed between and radially guided by said raceways, and second means for preventing relative movement between said machine elements in a direction parallel to said axis, said assembly being characterized in that each of said rolling elements is a needle having plane end faces which are perpendicular to the axis of the needle and said second means consist of the combination of said needles, a cage having bars including rectilinear bar portions which are parallel to said axis of rotation and interposed between said needles and capable of coacting with rectilinear portions of said needles adjacent said end faces thereof so as to maintain said needles parallel to said axis of said assembly, and two radially and circumferentially extending abutment faces respectively integral with said raceways, one of said abutment faces being engageable with one of said end faces of each needle and the other of said abutment faces being engageable with the other of said end faces of each needle.

19. An assembly as claimed in claim 18, wherein each of said bearings comprises a bearing ring constituting one of said raceways and having an open end, the open ends of said bearings facing each other and being in abutting relation with means preventing said rings from moving axially nearer to each other.

20. An assembly as claimed in claim 19, comprising between said open ends of said rings an interposed cylindrical spacer member against which said open ends bear.

21. An assembly as claimed in claim 20, comprising a connection between said two rings and said spacer member.

22. An assembly as claimed in claim 21, wherein said connection comprises tabs on one of the members consisting of said bearing and said spacer member and a corresponding recess in the other of said members in which recess said tabs are engaged.

23. An assembly having an axis of rotation and comprising in coaxial relation: a first machine element having two annular axially spaced shoulders; a second machine element; two journal rolling bearings interposed between said machine elements; one of said bearings fixing the axial position of one of said machine elements relative to the other in one direction and the other of said bearings fixing said axial position in the opposite direction; each of said bearings comprising means defining two raceways axially fixed in position relative to said machine elements, rolling elements interposed between and radially guided by said raceways, and second means for preventing relative movement between said machine elements in a direction parallel to said axis, said assembly being characterized in that each of said rolling elements is a needle having plane end faces which are perpendicular to the axis of the needle and said second means consist of the combination of said needles, cage having bars including rectilinear bar portion which are parallel to said axis of rotation and interposed between said needles and capable of coacting with rectilinear portions of said needles adjacent said end faces thereof so as to maintain said needles parallel to said axis of said assembly, and two radially and circumferentially extending abutment faces respectively integral with said raceways, one of said abutment faces being engageable with one of said end faces of each needle and the other of said abutment faces being engageable with the other of said end faces of each needle, one of said two abutment faces of each of said bearings being connected to one of said machine elements and means interposed between said abutment faces for regulating the distance therebetween and thereby rectifying deviations from normal operational axial clearance.

24. An assembly as claimed in claim 23, wherein said abutment faces connected to the machine element are formed on two washers which are coaxial with the corresponding machine element.

25. An assembly as claimed in claim 24, wherein one of the washers is fixed and the other is axially movable relative to the corresponding machine element.

26. An assembly as claimed in claim 25, wherein a spring is interposed between said washers.

27. An assembly as claimed in claim 25, wherein said washers are in one piece with a sleeve, a cylindrical portion of which has an axial elasticity.

28. An assembly as claimed in claim 27, wherein said cylindrical portion of said sleeve comprises transverse slots rendering said portion axially elastic.

29. An assembly as claimed in claim 25, wherein said fixed washer and said movable washer are respectively integral with two coaxial axially overlapping tubular elements, an intermediate expansion annular spacer member being provided and fixed at its ends to the corresponding ends of said tubular elements, so as to interconnect said tubular elements in said overlapping zone, the material and the length of said tubular elements and of said spacer member being so chosen as to result in a controlled heat expansion.

30. An assembly as claimed in claim 29, wherein one of said tubular elements has an axial elasticity.

31. An assembly as claimed in claim 25, wherein one of said washers is fixed and the other is axially and circumferentially movable, said washers being respectively in one piece with two tubular elements which surround the shaft and have contiguous end faces which are inclined relative to a plane perpendicular to the axis of the assembly, whereby a relative axial displacement of said two washers is produced under the effect of a relative movement of rotation of said tubular elements.

32. An assembly as claimed in claim 24, wherein said two washers are axially movable and compensating means bear against said washers and against two abutment means interposed between said washers and fixed relative to one of said machine elements.

33. An assembly as claimed in claim 32, wherein the axial position of said abutment means is axially adjustable.

34. An assembly having an axis of rotation and comprising in coaxial relation: a first machine element, a second machine element, a journal rolling bearing interposed between said machine elements and comprising means defining two raceways axially fixed in position relative to said machine elements, rolling elements interposed between and radially guided by said raceways, and second means for preventing relative movement between said machine elements in a direction parallel to said axis, said assembly being characterized in that each of said rolling elements is a needle having transverse end faces and said second means consist of the combination of said needles, a cage having bars including rectilinear bar portions which are parallel to said axis of rotation and interposed between said needles and capable of coacting with rectilinear portions of said needles adjacent said end faces thereof so as to maintain said needles parallel to said axis, and two radially and circumferentially extending abutment faces respectively integral with said raceways and contained in planes perpendicular to said axis, one of said abutment faces being engageable with one of said end faces of each needle and the other of said abutment faces being engageable with the other of said end faces of each needle, and said end faces of said needles having such shape in the region thereof engageable with said abutment faces that in the event of axial thrust in bearing operation said abutment faces exert a reaction force on said end faces in a direction normal to said end faces.

References Cited

UNITED STATES PATENTS

| | | | |
|---|---|---|---|
| 1,338,939 | 5/1920 | Loycock | 308—213 |
| 2,792,619 | 5/1957 | Komm | 308—212 |
| 3,248,155 | 4/1966 | Schaeffer | 308—212 |

FOREIGN PATENTS

| | | |
|---|---|---|
| 872,700 | 4/1953 | Germany. |

FRED C. MATTERN, Jr., Primary Examiner

F. SUSKO, Assistant Examiner

U.S. Cl. X.R.

308—212